United States Patent
Wang et al.

(10) Patent No.: US 10,374,445 B2
(45) Date of Patent: Aug. 6, 2019

(54) ISOLATED BIDIRECTIONAL CONSTANT-CURRENT MAINTENANCE SYSTEM BASED ON POWER SUPPLY SOURCE OF SHARED DEVICE

(71) Applicant: HANGZHOU GOLD ELECTRONIC EQUIPMENT INC., LTD., Hangzhou, Zhejiang Province (CN)

(72) Inventors: Hao Wang, Hangzhou (CN); Jianhong Xu, Hangzhou (CN)

(73) Assignee: HANGZHOU GOLD ELECTRONIC EQUIPMENT INC., LTD., Hangzhou (CN)

( * ) Notice: Subject to any disclaimer, the term of this patent is extended or adjusted under 35 U.S.C. 154(b) by 50 days.

(21) Appl. No.: 15/547,045

(22) PCT Filed: Jan. 19, 2016

(86) PCT No.: PCT/CN2016/071353
§ 371 (c)(1),
(2) Date: Jul. 27, 2017

(87) PCT Pub. No.: WO2016/119608
PCT Pub. Date: Aug. 4, 2016

(65) Prior Publication Data
US 2018/0019601 A1    Jan. 18, 2018

(30) Foreign Application Priority Data
Jan. 28, 2015 (CN) .......................... 2015 1 0041242

(51) Int. Cl.
*H02J 7/00* (2006.01)
*H02M 3/335* (2006.01)

(52) U.S. Cl.
CPC .......... *H02J 7/0026* (2013.01); *H02J 7/0019* (2013.01); *H02J 7/0021* (2013.01); *H02J 7/0047* (2013.01);
(Continued)

(58) Field of Classification Search
CPC ...... H02J 7/0019; H02J 7/0075; H02J 7/0086; H02J 7/0093
(Continued)

(56) References Cited

U.S. PATENT DOCUMENTS

| | | | |
|---|---|---|---|
| 2013/0335026 A1* | 12/2013 | Reynolds | H02J 7/0016 320/112 |
| 2014/0340044 A1* | 11/2014 | Kim | H02J 7/0016 320/134 |

FOREIGN PATENT DOCUMENTS

| | | |
|---|---|---|
| CN | 103066642 A | 4/2013 |
| CN | 103117577 A | 5/2013 |

* cited by examiner

*Primary Examiner* — Edward Tso
*Assistant Examiner* — Aaron Piggush
(74) *Attorney, Agent, or Firm* — Jiwen Chen

(57) ABSTRACT

The present invention relates to an isolating two-way constant-current maintenance system based on a power supply of shared equipment, comprising a power supply, an electronic switch K1, a current sensor, a main battery management system controller, and a plurality of secondary battery management system controllers; wherein the power supply is connected with the current sensor; the current sensor is respectively connected with the electronic switch K1 and the main battery management system controller; the electronic switch is respectively connected with the main battery management system controller and the secondary battery management system controllers; the main battery management system controller is respectively in a communication connection with the plurality of secondary battery manage- (Continued)

ment system controllers; and each one of the secondary battery management system controllers is connected with a battery pack. The isolating two-way constant-current maintenance system based on a power supply of shared equipment has the advantages of small size, low cost, high power conversion efficiency, two-way and constant maintenance, and low requirements on the power supply. The system can quickly enhance the utilization rate of the battery and effectively prolong the service life of the battery pack.

4 Claims, 3 Drawing Sheets

(52) U.S. Cl.
CPC .......... *H02J 7/0054* (2013.01); *H02J 7/0075* (2013.01); *H02M 3/33507* (2013.01)

(58) Field of Classification Search
USPC ................................ 320/134, 145, 159, 164
See application file for complete search history.

ISOLATED BIDIRECTIONAL CONSTANT-CURRENT MAINTENANCE SYSTEM BASED ON POWER SUPPLY SOURCE OF SHARED DEVICE

This is a U.S. national stage application of PCT Application No. PCT/CN2016/071353 under 35 U.S.C. 371, filed Jan. 19, 2016 in Chinese, claiming priority of Chinese Application No. 201510041242.X, filed Jan. 28, 2015, all of which are hereby incorporated by reference.

TECHNICAL FIELD

The present invention relates to an isolating two-way constant-current maintenance system based on a power supply of shared equipment, belonging to the field of battery maintenance management.

DESCRIPTION OF THE RELATED ART

At present, energy-saving stations, electric automobiles, etc. all need to use battery packs formed by connecting battery cells in series. Battery cells vary with battery capacity and performance because of production processes, etc. During charging and discharging of the battery packs, such variation is inevitably expanded, thus increasing the risk of over-charging/over-discharging batteries and reducing the utilization rate of the battery pack capacity at the same time. If such situation continues in this way, the vicious cycles will speed up the damage to the batteries. Therefore, in order to further improve the consistency of the battery packs, enhance the utilization rate of the battery pack capacity and prolong the service life of battery packs, battery packs need necessary maintenance. Batteries in a battery pack that have low residual power are charged, and those in a battery pack that have high residual power are discharged.

Current maintenance methods are classified into energy-consumption methods and non-energy-consumption methods. The energy-consumption method refers to discharging of battery cells that have high residual power by using resistors to consume excessive capacity, so the battery cells in a battery pack are consistent in the capacity. Such method is simple and low in cost, but the principle is that all battery cells are discharged using resistors to keep consistent with the battery cell that has the lowest power, so the working efficiency is extremely low and excessive electricity is wasted. Various non-energy-consumption methods are available, and are mainly classified into three types. The first type refers to transfer of energy in battery cells grade by grade, where the energy in battery cells that have a high capacity is transferred to those with a low capacity. However, when the number of battery cells existing between two battery cells where the capacity is transferred is relatively large, the maintenance efficiency is greatly reduced. The second type refers to charging or discharging of battery cells by using a one-way isolating maintenance power supply. By using such method, all battery cells need to be charged or discharged to reach the same capacity, so the balancing efficiency is average, and synchronous charging and discharging maintenance is not supported. The third type refers to maintenance of a battery pack by using a two-way maintenance power supply. According to such method, battery cells that have a low capacity are charged while battery cells that have a high capacity are discharged, which is equivalent to transferring of the power of battery cells that have a high capacity to battery cells that have a low capacity through two conversions, so the efficiency is high and the maintenance is fast. However, such method is difficult to implement, and is high in cost, and meanwhile, a transfer power supply is usually additionally needed to reach energy balance.

In order to solve the technical defects of the third type of non-energy-consumption maintenance method, the present invention provides an isolating two-way constant-current maintenance system based on a power supply of shared equipment.

BRIEF SUMMARY OF THE INVENTION

An object of the present invention is to provide an isolating two-way constant-current maintenance system based on a power supply of shared equipment. The system can maintain battery cells that need charging, and battery cells that need discharging, selected from the battery pack during the running process of the battery pack, and can carry out the charging maintenance and discharging maintenance at the same time, thus effectively ensuring the consistency of the battery pack, enhancing the energy utilization rate of the battery pack, and further prolonging the service life of the battery pack. Compared with the prior art, the system solution provided by the present invention effectively reduces cost, overcomes the defect of a general solution that needs an independent equipment power supply and needs a balanced power supply; meanwhile, the system does not continuously need the equipment power supply for a long time, and after equipment runs formally, the system can run independently and does not need a power supply.

To achieve the object of the present invention, the present invention provides an isolating two-way constant-current maintenance system based on a power supply of shared equipment, used for maintaining battery packs consisting of battery cells. The system comprises a power supply, an electronic switch K1, a current sensor, a main battery management system controller, and a plurality of secondary battery management system controllers, wherein the power supply is connected with the current sensor; the current sensor is respectively connected with the electronic switch K1 and the main battery management system controller; the electronic switch is respectively connected with the main battery management system controller and the secondary battery management system controllers; the main battery management system controller is respectively in a communication connection with the plurality of secondary battery management system controllers; and each one of the secondary battery management system controllers is connected with a battery pack.

Each one of the secondary battery management system controllers comprises a maintenance circuit, a battery cell acquisition circuit and a secondary MCU (Micro-programmed Control Unit); and the secondary MCU is respectively connected with the maintenance circuit and the battery cell acquisition circuit.

The main battery management system controller comprises a battery pack acquisition circuit and a main MCU; the main MCU is connected with the battery pack acquisition circuit; and the battery pack acquisition circuit is connected with two ends of the battery pack.

The maintenance circuit comprises a PWM (Pulse-Width Modulation) controller, a filter capacitor LL1, a field effect tube Q1, a transformer T, a field effect tube Q2, a filter capacitor LL2, a gating switch K, a signal switching circuit, a drive circuit, and a voltage-current acquisition and feedback circuit; two terminals, a, b, of a main coil of the transformer T are respectively connected with one end of the filter capacitor LL1 and a drain electrode of the field effect tube Q1; a source electrode of the field effect tube Q1 is connected with the other end of the filter capacitor LL1 and is grounded; two terminals, c, d, of a secondary coil of the transformer T are respectively connected with one end of the filter capacitor LL2 and a drain electrode of the field effect tube Q2; a source electrode of the field effect tube Q2 is connected with the other end of the filter capacitor LL2 and the voltage-current acquisition and feedback circuit; grid electrodes of the field effect tube Q1 and the field effect tube Q2 are respectively connected with the drive circuit; the terminal a of the main coil and the terminal c of the secondary coil of the transformer T are respectively connected with the voltage-current acquisition and feedback circuit; the two ends of the filter capacitor LL1 are respectively connected with an anode and a cathode of the power supply; the PWM controller is respectively connected with the voltage-current acquisition and feedback circuit, the signal switching circuit and the power supply; the signal switching circuit is connected with the drive circuit; the voltage-current acquisition and feedback circuit is connected with the gating switch; and the gating switch is connected with a battery cell in the battery pack.

The gating switch comprises a plurality of anode switches K4 and cathode switches K5 which correspond to the battery cells one by one; each one of the anode switches K4 has one end connected to the voltage-current acquisition and feedback circuit and the other end connected to the anode of the corresponding one of the battery cells; and each one of the cathode switches K5 has one end connected to the voltage-current acquisition and feedback circuit and the other end connected to the cathode of the corresponding one of the battery cells.

Preferably, the PWM controller in each one of the maintenance circuits is respectively in a communication connection with the main battery management system controller.

The communication mode of the present invention may be CAN communication, RS485 communication, GPRS, Wifi, 2.4G, Bluetooth, etc.

Preferably, the power supply is a switching power supply or an accumulator energy-saving device.

Preferably, the signal switching circuit comprises two single-pole double throw switches K2, K3; each one of the single-pole double throw switches K2, K3 has one end respectively connected to a PWMA port and a PWMB port of the PWM controller, and has the other end connected with the drive circuit.

The present patent has the following advantages. The whole system does not need continuous or long-term power supply; after the system runs normally, the power supply can be controlled to be switched off; meanwhile, the control of a maintenance channel reaches bus power supply balance through the charging and discharging maintenance that is carried out by using the current sensor and the maintenance circuit, avoiding the defect of other system solutions which need an independent and stable long-term power supply and need an independent balanced power supply. The whole system can perform charging maintenance and discharging maintenance on multiple batteries needing maintenance at the same time. The PWM signals generated by the PWM controller are sent to the drive circuit of the field effect tubes through the signal switching circuit; the drive circuit of the field effect tubes drive the field effect tubes; the gating switch gates one of the battery cells in a battery module, realizing charging or discharging of the battery cell. The PWM controller generates two PWM signals, namely PWMA and PWMB, wherein the PWMA is a main exciting signal and the PWMB is a synchronous rectifying signal. During charging, the PWMA signal controls the field effect tube Q1, and the PWMB signal controls the field effect tube Q2. During discharging, the PWMA signal controls the field effect tube Q2, and the PWMB signal controls the field effect tube Q1. The voltage-current acquisition and feedback circuit realizes constant-current charging or discharging, and feeds back voltage at the same time to realize over-voltage protection. The isolating two-way constant-current maintenance system based on a power supply of shared equipment has the advantages of small size, low cost, high power conversion efficiency, two-way and constant maintenance, low requirements on the power supply. The system can quickly enhance the utilization rate of the battery and effectively prolong the service life of the battery pack.

DETAILED DESCRIPTION OF THE INVENTION

The present invention is described in further detail in conjunction with the attached drawings and embodiments.

Figure 1:
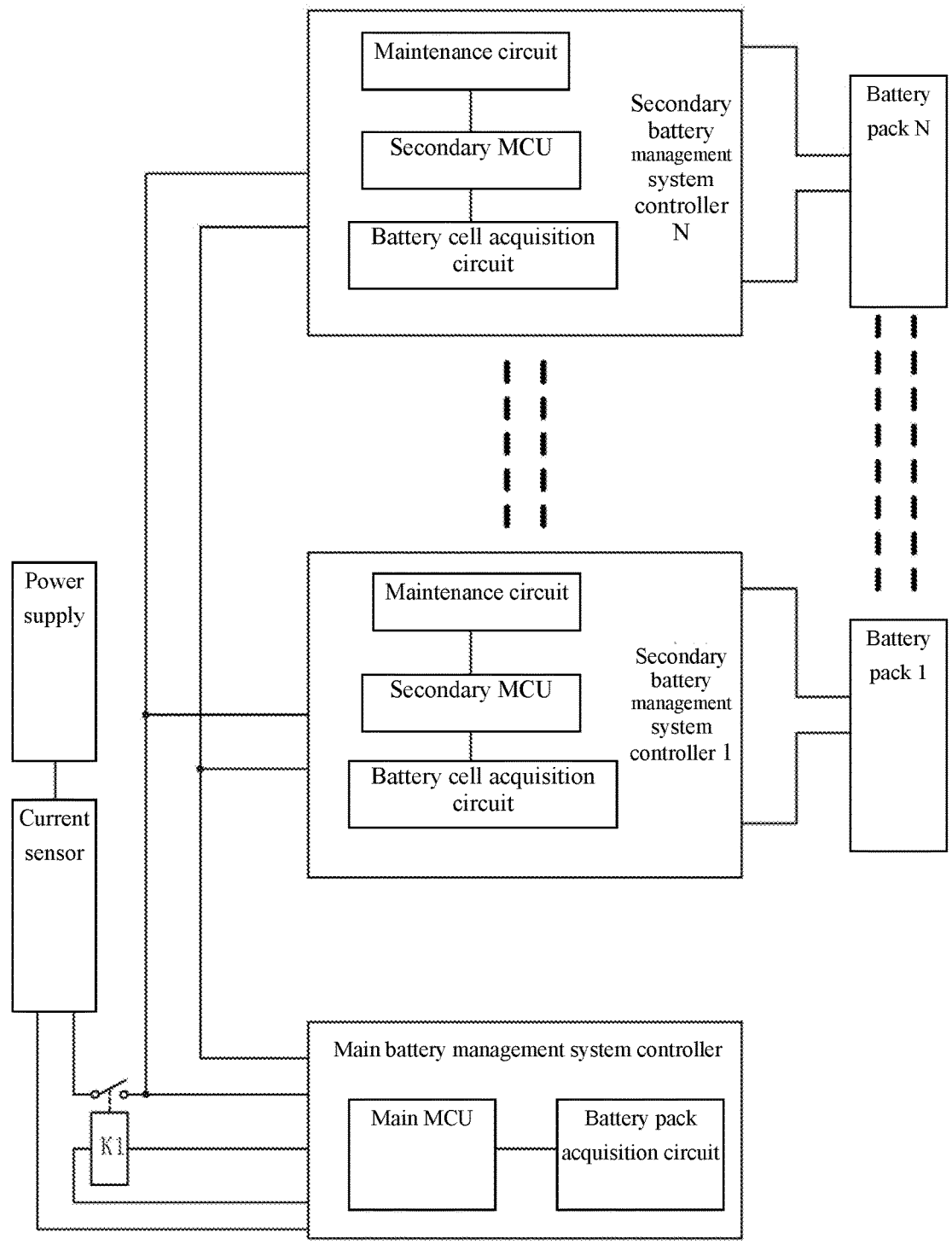
FIG. 1 is a structural view of an isolating two-way constant-current maintenance system based on a power supply of shared equipment of the present invention.

As shown in FIG. 1, an isolating two-way constant-current maintenance system based on a power supply of shared equipment is used for maintaining battery packs consisting of battery cells, including a power supply, an electronic switch K1, a current sensor, a main battery management system controller, and a plurality of secondary battery management system controllers, wherein the power supply is connected with the current sensor; the current sensor is respectively connected with the electronic switch K1 and the main battery management system controller; the electronic switch is respectively connected with the main battery management system controller and the secondary battery management system controllers; the main battery management system controller is respectively in a communication connection with the plurality of secondary battery management system controllers; and each one of the secondary battery management system controllers is connected with a battery pack.

Each one of the secondary battery management system controllers comprises a maintenance circuit, a battery cell acquisition circuit and a secondary MCU (Micro-programmed Control Unit); and the main battery management system controller comprises a battery pack acquisition circuit and a main MCU. Each one of the secondary MCUs is respectively connected with the maintenance circuit and the battery cell acquisition circuit; the battery cell acquisition circuit is connected with two ends of a battery cell to acquire data such as voltage, current and temperature of the battery cell. The main MCU is connected with the battery pack acquisition circuit, and the battery pack acquisition circuit is connected with the two ends of a battery pack to acquire data such as voltage, current and temperature of the whole battery pack.

Figure 2:
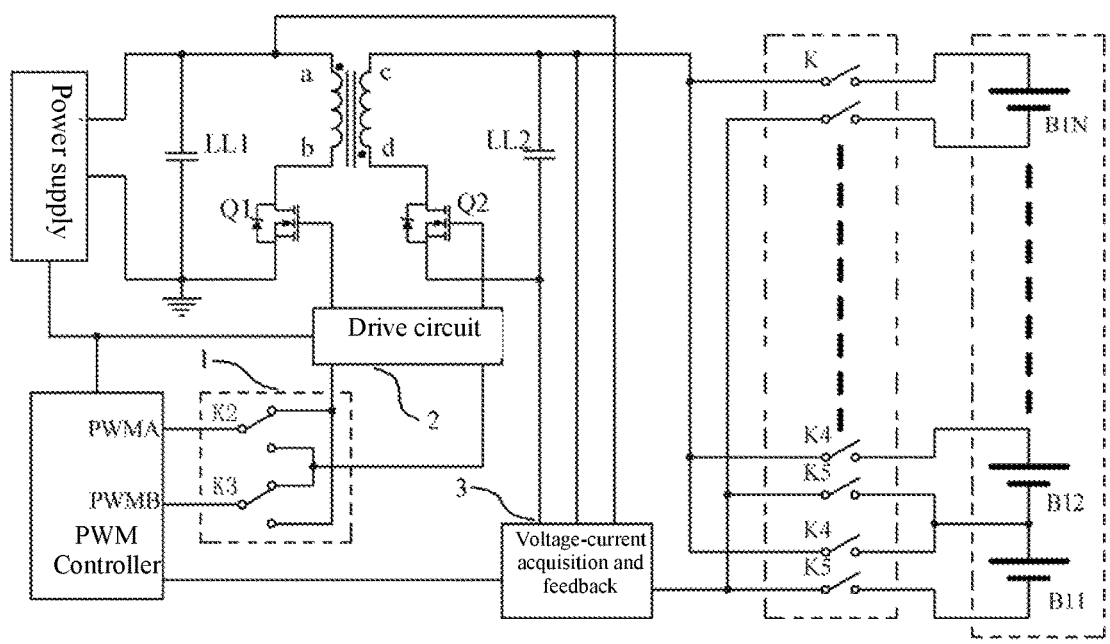
FIG. 2 is a circuit diagram of a maintenance circuit of the present invention.
Figure 3:
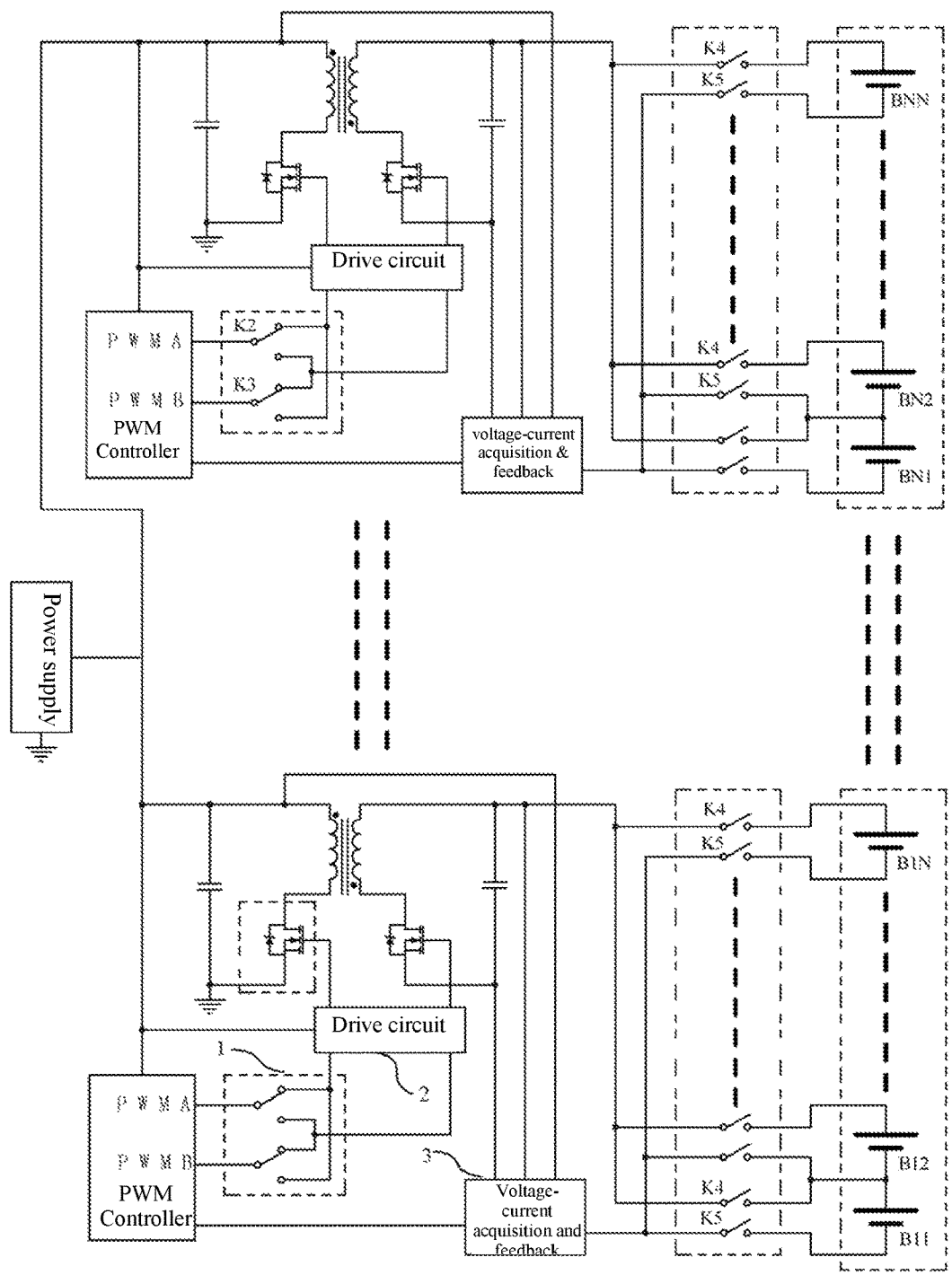
FIG. 3 is a circuit diagram of connection of several maintenance circuits of the present invention.

As shown in FIG. 2 and FIG. 3, the maintenance circuit includes a PWM (Pulse-Width Modulation) controller, a filter capacitor LL1, a field effect tube Q1, a transformer T, a field effect tube Q2, a filter capacitor LL2, a gating switch K, a signal switching circuit 1, a drive circuit 2, and a voltage-current acquisition and feedback circuit 3; two terminals, a, b, of a main coil of the transformer T are respectively connected with one end of the filter capacitor LL1 and a drain electrode of the field effect tube Q1; a source electrode of the field effect tube Q1 is connected with the other end of the filter capacitor LL1 and is grounded; two terminals, c, d, of a secondary coil of the transformer T are respectively connected with one end of the filter capacitor LL2 and a drain electrode of the field effect tube Q2; a source electrode of the field effect tube Q2 is connected with the other end of the filter capacitor LL2 and the voltage-current acquisition and feedback circuit 3; grid electrodes of the field effect tube Q1 and the field effect tube Q2 are respectively connected with the drive circuit 2; the terminal a of the main coil and the terminal c of the secondary coil of the transformer T are respectively connected with the voltage-current acquisition and feedback circuit 3; the two ends of the filter capacitor LL1 are respectively connected with an anode and a cathode of the power supply; the PWM controller is respectively connected with the voltage-current acquisition and feedback circuit 3, the signal switching circuit 1 and the power supply; the signal switching circuit 1 is connected with the drive circuit 2; the voltage-current acquisition and feedback circuit 3 is connected with the gating switch; and the gating switch is connected with a tested battery pack.

The gating switch includes a plurality of anode switches K4 and cathode switches K5 which correspond to the battery cells one by one; each one of the anode switches K4 has one end connected to the voltage-current acquisition and feedback circuit and the other end connected to the anode of the corresponding one of the battery cells; and each one of the cathode switches K5 has one end connected to the voltage-current acquisition and feedback circuit and the other end connected to the cathode of the corresponding one of the battery cells.

The PWM controller in each one of the maintenance circuits is respectively in a communication connection with the main battery management system controller. The power supply is a switching power supply or an accumulator energy-saving device.

The signal switching circuit comprises two single-pole double throw switches K2, K3; each one of the single-pole double throw switches K2, K3 has one end respectively connected to a PWMA port and a PWMB port of the PWM controller, and has the other end connected with the drive circuit. The drive circuit controls the startup of the field effect tubes Q1, Q2. The voltage-current acquisition and feedback circuit is implemented by using existing mature technologies.

The working principle of the present invention is as follows. The PWM controller generates two PWM signals, namely PWMA and PWMB, wherein the PWMA is a main exciting signal and the PWMB is a synchronous rectifying signal. The PWMA and the PWMB are distributed to the field effect tube Q1 and the field effect tube Q2 through the signal switching circuit 1. During charging, the PWMA signal controls the field effect tube Q1, and the PWMB signal controls the field effect tube Q2. During discharging, the PWMA signal controls the field effect tube Q2, and the PWMB signal controls the field effect tube Q1. The gating switch K controls one of the battery cells in the tested battery pack to be selected, and can charge or discharge the selected battery cell. The voltage-current acquisition and feedback circuit 3 acquires the magnitude of the charging or discharging current and feeds the acquired data to the PWM controller to realize constant-current charging or discharging, and acquires voltages on two sides at the same time to realize over-voltage protection. On-off time sequence of the field effect tube Q1 and the field effect tube Q2 during charging is as follows. I. The field effect tube Q1 is switched on; the field effect tube Q2 is switched off; and the energy in the power supply is transferred into the transformer T via the field effect tube Q1; II. The field effect tube Q1 is switched off; the field effect tube Q2 is switched off; the energy in the transformer T is transferred to the filter capacitor LL2 and the battery cell via the a body diode of the field effect tube Q2; this process is short and is dead zone time; III. The field effect tube Q1 is switched off; the field effect tube Q2 is switched on; the energy in the transformer T is transferred to the filter capacitor LL2 and the battery cell via the field effect tube Q2; the switching-on voltage drop of the field effect tube Q2 is far lower than the switching-on voltage drop of the body diode thereof, so the efficiency of the power supply balancing is greatly enhanced through using the switching-on of the field effect tube Q2 to perform synchronous rectifying; IV. The field effect tube Q1 is switched off; the field effect tube Q2 is switched off; this process is short and is dead-zone time. Thus, a cycle ends. The charging process is the continuous circulation of such four processes. Similarly, during the discharging, the time sequence of the field effect tube Q1 and the field effect tube Q2 is reverse to that of the charging process.

The specific embodiments described in the text are used for illustrating the principle of the present invention only. Those skilled in the art can make various amendments or supplementations or take similar substitutions on the basis of the described specific embodiments. The amendments, supplementations and substitutions should fall within the principle of the protective scope claimed by the claims of the present invention.

The invention claimed is:

1. An isolating two-way constant-current maintenance system based on a power supply of shared equipment, used for maintaining battery packs consisting of battery cells, the system comprising a power supply, an electronic switch (K1), a current sensor, a main battery management system controller, and a plurality of secondary battery management system controllers, wherein the power supply is connected with the current sensor; the current sensor is respectively connected with the electronic switch (K1) and the main battery management system controller; the electronic switch is respectively connected with the main battery management system controller and the secondary battery management system controllers; the main battery management system controller is respectively in a communication connection with the plurality of secondary battery management system controllers; each one of the secondary battery management system controllers is connected with a battery pack;

wherein each one of the secondary battery management system controllers comprises a maintenance circuit, a battery cell acquisition circuit and a secondary MCU (Micro-programmed Control Unit); the secondary MCU is respectively connected with the maintenance circuit and the battery cell acquisition circuit;

wherein the main battery management system controller comprises a battery pack acquisition circuit and a main MCU; the main MCU is connected with the battery pack acquisition circuit; the battery pack acquisition circuit is electrically connected with anode and cathode ends of the battery pack;

wherein the maintenance circuit comprises a PWM (Pulse-Width Modulation) controller, a first filter capacitor (LL1), a first field effect tube (Q1), a transformer (T), a second field effect tube (Q2), a second filter capacitor (LL2), a gating switch (K), a signal switching circuit, a drive circuit, and a voltage-current acquisition and feedback circuit; a first terminal (a) and a second terminal (b) of a main coil of the transformer (T) are respectively connected with one end of the first filter capacitor (LL1) and a drain electrode of the first field effect tube (Q1); a source electrode of the first field effect tube (Q1) is connected with the other end of the first filter capacitor (LL1) and is grounded; a first terminal (c) and a second terminal (d) of a secondary coil of the transformer (T) are respectively connected with one end of the second filter capacitor (LL2) and a drain electrode of the second field effect tube (Q2); a source electrode of the second field effect tube (Q2) is connected with the other end of the second filter capacitor (LL2) and the voltage-current acquisition and feedback circuit; grid electrodes of the first field effect tube (Q1) and the second field effect tube (Q2) are respectively connected with the drive circuit; the first terminal (a) of the main coil and the first terminal (c) of the secondary coil of the transformer (T) are respectively connected with the voltage-current acquisition and feedback circuit; the two ends of the first filter capacitor (LL1) are respectively connected with an anode and a cathode of the power supply; the PWM controller is respectively connected with the voltage-current acquisition and feedback circuit, the signal switching circuit and the power supply; the signal switching circuit is connected with the drive circuit; the voltage-current acquisition and feedback circuit is connected with the gating switch; the gating switch is connected with the battery pack; and wherein the gating switch comprises a plurality of anode switches (K4) and cathode switches (K5) which correspond to the battery cells one by one; each one of the anode switches (K4) has one end connected to the voltage-current acquisition and feedback circuit and the other end connected to the anode of the corresponding one of the battery cells; and each one of the cathode switches (K5) has one end connected to the voltage-current acquisition and feedback circuit and the other end connected to the cathode of the corresponding one of the battery cells.

2. The isolating two-way constant-current maintenance system based on a power supply of shared equipment according to claim 1, characterized in that the PWM controller in each one of the maintenance circuits is respectively in a communication connection with the main battery management system controller.

3. The isolating two-way constant-current maintenance system based on a power supply of shared equipment according to claim 1, characterized in that the power supply is a switching power supply or an accumulator energy-saving device.

4. The isolating two-way constant-current maintenance system based on a power supply of shared equipment according to claim 1, characterized in that the signal switching circuit comprises two single-pole double throw switches (K2, K3); each one of the two single-pole double throw switches (K2, K3) has one end respectively connected to a PWMA port and a PWMB port of the PWM controller, and has the other end connected with the drive circuit.

* * * * *